April 23, 1957   W. F. POWERS ET AL   2,790,122
LOAD RESISTOR COOLING SYSTEM
Filed Jan. 29, 1954
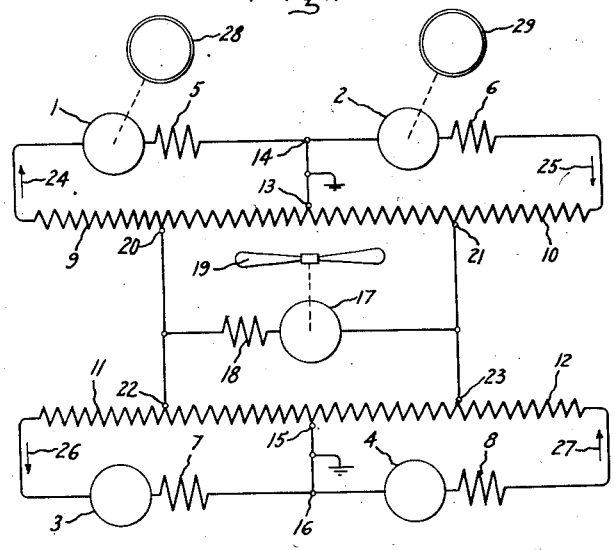
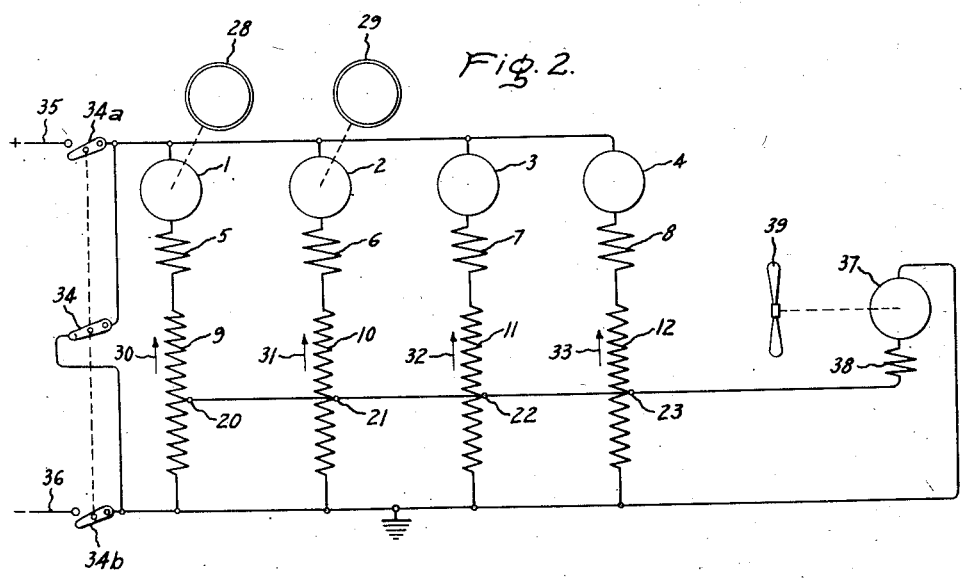
Inventors:
Wallace F. Powers,
Robert B. Bradstock,
by Claude A. Mott.
Their Attorney.

United States Patent Office 2,790,122
Patented Apr. 23, 1957

2,790,122
LOAD RESISTOR COOLING SYSTEM

Wallace F. Powers and Robert B. Bradstock, Erie, Pa., assignors to General Electric Company, a corporation of New York Application January 29, 1954, Serial No. 406,955

6 Claims. (Cl. 318—87)

This invention relates to means for cooling load limiting resistors, and more particularly, to cooling these resistors in proportion to the load current they carry.

In a multiple traction motor locomotive, it is necessary to have load limit resistors for each traction motor. A blower motor in load limit resistor cooling systems is usually connected across a special high resistance load resistor. Connecting the blower motor across this resistor lowers its effective resistance so that the system appears to be balanced. Should any one of the traction wheels slide, the system will immediately become unbalanced because the resistor across the traction motor connected to this sliding wheel requires less cooling than the other load resistors. This is particularly damaging when the traction wheel supplying power to the blower motor slides, because it allows the blower motor to slow down without a reduction in the load current of the other load resistors.

It is, therefore, an object of our invention to provide a simple and inexpensive power supply for a blower motor that is responsive to the load current in each of the resistors being cooled.

It is a further object of our invention to provide a braking resistor cooling system where wheel slide on one or more motors will not stop the blower motor as long as there is a load current in any of the load resistors.

Briefly, in accordance with our invention, each of a plurality of traction motors is connected to similar current limiting resistors, and a blower motor is connected across an equal resistive portion of each resistor. This makes it possible for the blower motor to employ some of the energy generated by each of the traction motors during the braking cycle, and at the same time, to use this energy to drive a blower for cooling the various resistors. Thus, it is readily seen that the slide of any wheel driving a traction motor will not eliminate the power supply of the blower motor.

The features of this invention, which we believe to be novel, are set forth with particularity in the appended claims. Our invention itself, however, both as to its organization and method of operation, together with further objects and advantages thereof, may best be understood by referring to the following description taken in conjunction with the accompanying drawings in which:

Fig. 1 is a schematic circuit diagram of one embodiment of this invention; and

Fig. 2 is a schematic circuit diagram of another embodiment of this invention.

Referring now to the Fig. 1, we have shown a traction motor system having traction motors 1, 2, 3, and 4. Each of these motors has at least one field represented by the fields shown as 5, 6, 7 and 8 respectively. When it is desired to slow these traction motors by dynamic braking, a resistor is placed across each motor to absorb the power from the motor and dissipate it as heat. These resistors are each of similar impedance and shown as 9, 10, 11, and 12 respectively. To stabilize the dynamic braking voltage, load resistors 9 and 10 may be connected to ground at 13, and the motors 1 and 2 may be connected to ground at 14. Similarly, to stabilize the voltage between resistors 9 and 10 and resistors 11 and 12, load resistors 11 and 12 may be grounded at 15; and motors 3 and 4 may be grounded at 16.

When the dynamic braking resistors 9, 10, 11, and 12 are connected across the motors 1, 2, 3, and 4 it is desirable to cool these resistors by some type of blower 19 so that the size of the resistors may be reasonably reduced without danger of burning out the resistor grids. The blower motor 17, shown as a direct current series motor having a field 18, is drivingly connected to the blower 19 in order to circulate cooling air past the resistors 9, 10, 11, and 12.

To furnish power to the blower motor 17, voltage taps are provided on resistors 9, 10, 11, and 12 at points 20, 21, 22, and 23 respectively, so that each of the segments 20—13, 13—21, 22—15, and 15—23, has a similar impedance and a similar voltage when the resistors carry a balanced braking current. Thus, during dynamic braking, the motor 1 becomes a generator driven by wheel 28 and causes current to flow in the direction shown by the arrow 24. This current produces a voltage between points 13 and 20. When the motor 2 is connected for dynamic braking, it causes current to flow in the direction shown by arrow 25. This current produces a voltage between points 13 and 21. Should the point 14 not be grounded, the generators 1 and 2 will be connected for series operation, and the resistors 9 and 10 will act as a series load. It should be noted that the voltage of points 20 and 21 are of opposite polarity with respect to the voltage at junction 13. Thus, a voltage equal to the vectoral sum of voltage 20—13 and 13—21 is produced across the blower motor 17 and the series field 18.

Similarly, the motor 3, when used for dynamic braking, produces a current flow in the direction shown by the arrow 26, and the motor 4 produces a current flow in the direction shown by the arrow 27. Thus, the points 22 and 23 have a voltage of opposite polarity with respect to the junction 15. When all of the traction motors are properly connected and acting as similar generators without wheel slide during the dynamic braking period, the normal voltage appearing at the points 21 and 23 will be similar, even if not connected, and the normal voltage appearing at 20 and 22 will also be similar even if not connected.

Frequently, during dynamic braking, one of the wheels connected to one of the traction motors will be slowed by wheel slide. Assuming that the traction motor 2 is connected to a slipping wheel 29, it may be seen that the voltage across resistor 10 and the voltage at the point 21 will tend to drop proportional to the slide. This slide of the wheel 29 will also cause the voltage at the point 23 to drop slightly because of the effectively lowered resistance between the point 23 and the ground caused by the fact that some of the current from 23 passes through the portion 21—13 to ground. This will reduce the blower motor speed to some extent. However, when the traction motor 2 is stopped by sliding of wheel 29, the resistors 9, 11, and 12 will be cooled by the air circulated by the blower 19 without resistor 10 appreciably heating the circulated air, and the system will still be protected against over-heating. It is obvious that this system causes the blower motor 17 to revolve at a speed which is a function of and responsive to the current through and the voltage across each of the resistors 9, 10, 11, and 12 and thus to cool these resistors in proportion to the cooling necessary for the particular current load therein.

Should wheels 28 and 29 both be sliding, the blower motor 17 still operates because of the voltage between points 22 and 23. The speed of the blower is reduced because of the reduction in the effective resistance between points 22 and 23. Should it happen that all four of the traction motors cause the wheels to slip so that no voltage is produced across resistors 9, 10, 11, and 12, the blower motor will stop functioning. But at this time, the resistors 9, 10, 11, and 12 are not carrying any current and will not require additional cooling. When the locomotive or other vehicle driven by these direct current traction motors has been stopped, the blower motor will automatically stop because no voltage is produced across the load resistors 9, 10, 11, and 12. At this time, no cooling is required.

The currents 24, 25, 26 and 27 could all be reversed without changing the operation of this invention, but it is not possible to have the current produced by the traction motors flow in two directions such as would result by reversing the currents 25 and 27. If currents 25 and 27 are reversed by improper connection of the resistors to their common junction, the voltages at points 20, 21, 22, and 23 would be of the same polarity with respect to the point 13 or 15 respectively, and the net voltage across the blower motor 17 would be zero.

The motor 17 could have one end connected to resistors 9 and 11 and be grounded at the other end and still substantially perform as we have shown. However, such a connection does not give the desired balance so that the blower motor 17 will operate at a speed proportional to the current in each of the load resistors. Should there be only two traction motors, connections 22 and 23 could be removed and the operation of the blower motor 17 would still depend on the current through the two resistors 9 and 10 and give satisfactory results depending on the load in these resistors. Similarly, should there be an odd number of motors such as 3, connection 23 could be removed, and the operation of the blower motor would still be proportional to the load current of the remaining resistors.

Referring to Fig. 2, we have shown a system where the blower motor is connected between the points 20, 21, 22, and 23 (which are electrically shunted) and ground. Thus, Fig. 2 shows a system that may be utilized when resistors 9, 10, 11, and 12 are connected to carry current from or to, the common ground. The blower motor 17 will receive power from any of the traction motors that are acting as generators and will operate when at least one of them is acting as a generator during dynamic braking. It should be noted that the system shown in Fig. 2 could also carry out the objects of this invention during regenerative braking as well as dynamic braking if the motors were connected at one end to furnish power as shown by arrows 30, 31, 32, and 33 to the power supply instead of merely being connected across the resistors 9, 10, 11, and 12. This connection could be easily accomplished by opening the switch 34 and simultaneously closing the contacts 34a and 34b to connect the motors to the lines 35 and 36 of the power supply. The system of Fig. 2 will also function according to this invention during motoring. This will be possible so long as the current in the resistors is in the same direction with respect to the other resistors when the motors are being driven by the wheels or the power supply. The blower motor connection in Fig. 2 will cause the operation of the blower 39 in response to load current in at least one of the load resistors during either the motoring or the braking cycle.

While we have shown particular embodiments of our invention, it will be understood, of course, that we do not wish to be limited thereto since many modifications may be made, and we, therefore, aim by the appended claims to cover any such modifications as fall within the true spirit and scope of our invention.

What we claim as new and desire to secure by Letters Patent of the United States is:

1. In a dynamic braking system, a pair of similar direct current motors serially connected and adapted to be driven as generators so that the voltages are additive, a pair of similar load resistors serially connected so that they have a common junction, said motors and said resistors connected to form a loop, a blower for cooling said resistors, a blower motor drivingly connected to said blower and a voltage tap on each of said resistors at a point of equal resistive distance from said junction, saidj blower motor connected to said taps so that said blower motor operates at a speed responsive to the current in said resistors whereby said resistors are cooled in proportion to the current carried by said resistors.

2. A dynamic braking system for controlling the speed of the blower motor comprising a first direct current motor connected across a first dynamic braking resistor, a second direct current motor connected across a second dynamic braking resistor, said direct current motors being adapted to be load driven as generators said resistors connected at a common junction so that said first resistor will carry current to said junction when said first direct current motor is acting as a generator and said second resistor will carry current from said junction when said second direct current motor is acting as a generator, a blower for cooling said resistors, a blower motor drivingly connected to said blower, and a voltage tap on each of said resistors at a point of equal resistive distance from said junction, said blower motor connected to said taps so that said blower motor operates at a speed responsive to the voltage between said taps whereby said resistors are cooled in proportion to the current carried by said resistors.

3. In a blower control system, similar load resistors each connected across a different source of variable direct current voltage, said resistors each connected at one end to a common junction so that at least one of the resistors carries current to said junction and the remainder of said resistors carry current from said junction, a voltage tap on each of said resistors an equal resistive distance from said junction, said taps connected so that all positive taps are electrically joined and all negative taps are electrically joined, a blower for cooling said resistors, and a blower motor drivingly connected to said blower and electrically connected between said positive taps and said negative taps so that said motor operates only when a current is carried in at least one of said load resistors.

4. In a traction motor braking system, a pair of similar direct current traction motors adapted to be driven as generators, a pair of similar load resistors each connected at one end to one of said motors to receive power therefrom and at the other end to a common junction, a blower for cooling said resistors, a blower motor drivingly connected to said blower and an electrical connection between each of said resistors at a point of equal resistive distance from said junction, said blower motor serially connected between said connection and said junction so that said blower motor operates at a speed responsive to a current in a portion of said resistors when at least one of said traction motors operates as a generator.

5. In a regenerative braking system for controlling the speed of the blower motor drivingly connected to a blower for cooling load limiting resistors, a first direct current traction motor serially connected to a first load resistor across the power supply to furnish power to said supply when being driven as a generator, second direct current traction motor serially connected to a second load resistor across said power supply to furnish power to said supply when being driven as a generator, said resistors connected to have a common junction, a blower for cooling said resistors, a blower motor drivingly connected to said blower, and a connection between said resistors at a point on each resistor an equal resistive distance from said junction, said blower motor electrically connected between said connection and said junction to receive power from at least one of said motors, when current flows in said resistors.

6. In combination with a plurality of series connected pairs of motors adapted to be load driven as generators, a dynamic braking load resistor connected across each of said motors, said load resistors connected in series to form series connected resistor pairs for each pair of motors, two conductors connected in pairs to points of normally equal potential of said resistor pairs, a blower for cooling said resistors and a blower motor operatively connected to said blower and electrically connected across said two conductors whereby slowing or stopping of less than all of said generating motors does not stop said blower motor.

References Cited in the file of this patent

UNITED STATES PATENTS

| | | |
|---|---|---|
| 2,317,254 | Cowin | Apr. 20, 1943 |
| 2,544,544 | Qualley et al. | Mar. 6, 1951 |

FOREIGN PATENTS

| | | |
|---|---|---|
| 538,908 | Germany | Nov. 21, 1931 |